United States Patent [19]
Broady et al.

[11] Patent Number: 5,495,288
[45] Date of Patent: Feb. 27, 1996

[54] REMOTE ACTIVATED SUVEILLANCE SYSTEM

[75] Inventors: George K. Broady, Dallas, Tex.;
Ronald L. Nichols, Louisville, Colo.;
James D. Pritchett, Dallas, Tex.

[73] Assignee: Ultrak, Inc., Carrollton, Tex.

[21] Appl. No.: 189,022

[22] Filed: Jan. 28, 1994

[51] Int. Cl.⁶ ........................................... H04N 7/18
[52] U.S. Cl. .................... 348/155; 348/838; 348/839
[58] Field of Search .................................. 348/158, 159, 348/152, 153, 154, 155, 156, 157, 8, 838, 839, 143; H04N 7/18

[56] References Cited

U.S. PATENT DOCUMENTS

| | | | |
|---|---|---|---|
| 3,699,250 | 10/1972 | Bunting | 348/8 |
| 4,766,491 | 8/1988 | Saitoh | 348/143 |
| 4,969,046 | 11/1990 | Sugimoto | 348/839 |
| 5,428,388 | 6/1995 | von Bauer | 348/155 |

*Primary Examiner*—Howard W. Britton
*Attorney, Agent, or Firm*—Jenkens & Gilchrist

[57] ABSTRACT

A surveillance system having a monitor, a camera connected to the monitor by a camera cable, an event recorder connected to the monitor by a recorder cable, and an activation unit connected to the camera by an activation unit cable. The monitor receives power through a power cable. A power supply in the monitor supplies power to the camera and the activation unit receives power from the camera. The power supply of the monitor also provides power to the event recorder. The monitor displays video and audio signals from the camera. When the activation unit detects a condition for which the surveillance system is to record, the activation unit sends an activation signal through the activation unit cable, camera, and camera cable to the monitor. A processor in the monitor sends a command to the event recorder over the recorder cable to record the video and audio signals generated by the camera, which are also sent to the event recorder over the recorder cable.

10 Claims, 3 Drawing Sheets

REMOTE ACTIVATED SUVEILLANCE SYSTEM

BACKGROUND OF THE INVENTION

1. Field of the Invention

This invention relates to surveillance equipment and, more particularly, to a remote activated surveillance systems.

2. History of the Prior Art

It is known in the art that surveillance systems can include items such as cameras, monitors, and VCR/event recorders. It is also known in the art to use an activation device such as an infrared detector in such systems. However, in the prior art these individual components of a surveillance system typically receive power from separate sources.

Requiring the separate components of a surveillance system to receive power from separate power sources places additional requirements on the system. For example, if the recorder, monitor, camera, and activation device all receive power from different sources, each of these individual components must have separate power cables for receiving power from the separate power sources, and separate power supplies for converting that power source to a form usable by the individual component.

Requiring the separate components of a surveillance system to receive power from separate power sources also complicates the installation of the surveillance system. For example, if the recorder, monitor, camera, and activation device all receive power from different outlets in a house, for example, the installer must be sure to plug each of those various separate components into the separate wall operative sockets.

It would be an advantage therefore to provide a surveillance system in which the individual components of the system are not required to receive power from separate power sources.

SUMMARY

To overcome the aforementioned shortcomings and deficiencies, the present invention generally provides an improved surveillance system in which components, including the activation unit, receive power from a common source.

In one aspect of the present invention, the surveillance system comprises a television camera, a television monitor, an event recorder, a means for delivering surveillance signals from said television camera to said television monitor, a means for delivering surveillance signals from said television camera to said event recorder, an activation unit, a means for delivering power to said monitor, a means for delivering power to said camera from said monitor, a means for delivering power from said camera to said activation unit, and a means for delivering a command from said activation unit to said event recorder.

In yet another aspect, the present invention comprises an event recorder, a television monitor, a plurality of television cameras, a plurality of activation units, means for delivering power to said television monitor, means for delivering power to said plurality of television cameras from said television monitor, means for delivering power to said plurality of activation units from said plurality of television cameras, means for delivering surveillance signals from said plurality of television cameras to said television monitor, means for delivering said surveillance signals from said plurality of television cameras to said event recorder, means for delivering an activation signal from one of said plurality of activation units to one of said plurality of television cameras, processor means for receiving said activation signal from said one of said plurality of television cameras and causing said television monitor to display said surveillance signals from said one of said television cameras, and causing said event recorder to record the surveillance signals from said one of said television cameras.

In yet another aspect, the present invention is a method of powering a surveillance system comprising the steps of providing electrical power to a monitor from a power source, providing electrical power to an event recorder from said monitor, providing electrical power to a camera from said monitor, and providing electrical power to an activation unit from said camera.

DETAILED DESCRIPTION

Figure 1:
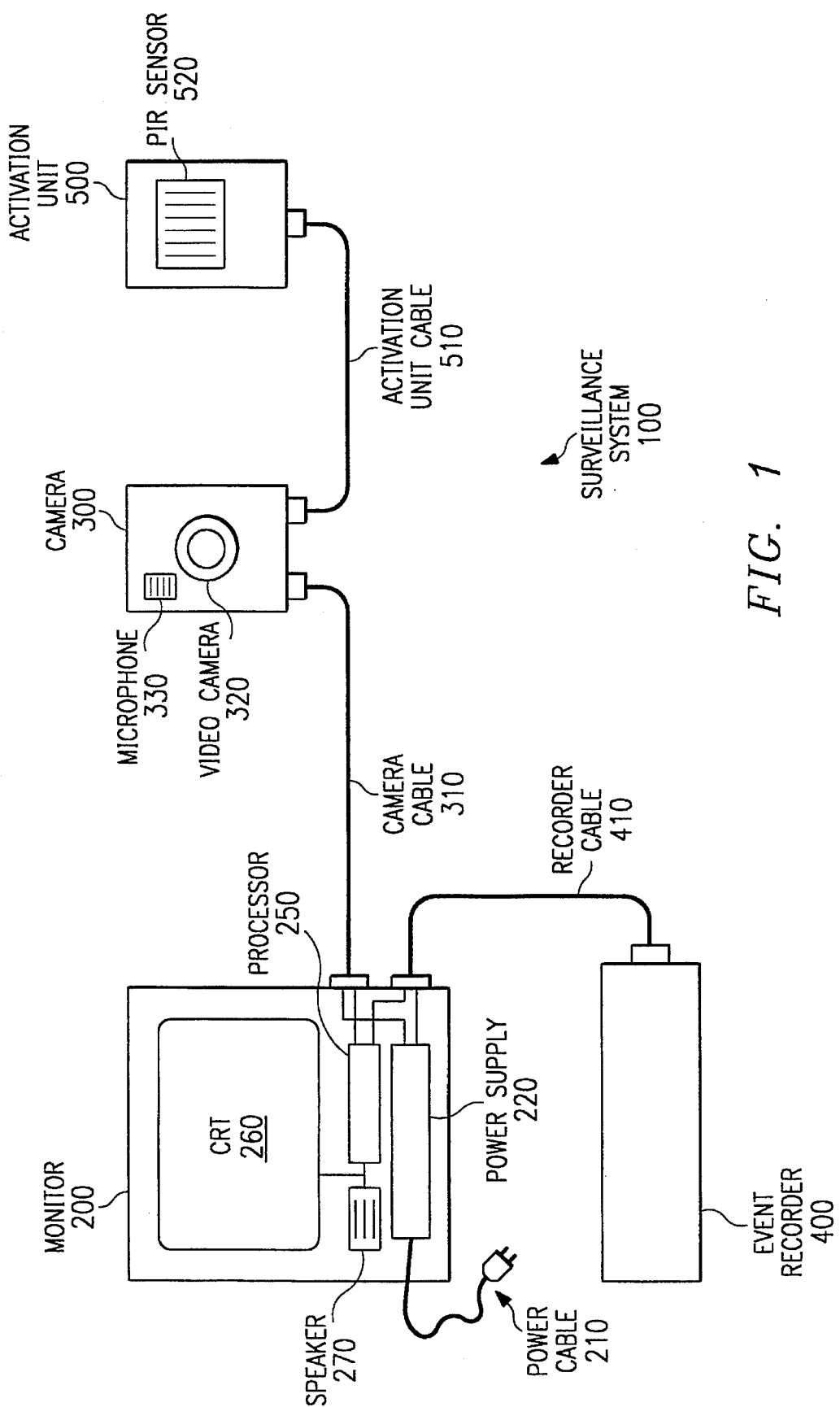
FIG. 1 is a block diagram of a preferred embodiment of the present invention having a monitor, a camera, an event recorder, and an activation unit.

Referring first to FIG. 1, there is shown a block diagram of a preferred embodiment of the present invention, which illustrates a surveillance system 100. The surveillance system 100 generally comprises a monitor 200, a camera 300 connected to the monitor 200 by a cable 310, an event recorder 400 connected to the monitor 200 by a cable 410, and an activation unit 500 connected to the camera 300 by a cable 510. The monitor 200 can be a standard closed circuit television (CCTV) monitor for security purposes such as the Exxis monitor Model KM-091Co The camera 300 is a standard CCTV camera such as the Exxis camera Model PSC-1. The event monitor is any type of recording device suitable for recording audio and video signals, for example, a VCR real time or event recorder, such as the CCTV Source Model UL200 VCR . The activation unit 500 can be any standard activation unit for a security system, such as the Exxis passive infrared motion detector Model KO-800. Although specific models and examples of the components for the surveillance system 100 have been disclosed, it is not meant in any way to limit the present invention to the specific components. Any components which are capable of performing the same functions as the components in the present invention can be incorporated in place of the specific component makes and models listed herein.

The monitor 200 receives power through a power cable 210. A power supply 220 in the monitor 200 converts the power from the power cable 220 into a form useable by the camera 300 and the activation unit 500. The camera 300 receives the converted power from the power supply 220 through the camera cable 310. The activation unit 500 receives this converted power from the camera 300 through the activation unit cable 510. The power supply 220 also converts power from the power cable 210 into a form useable by the event recorder 400, and transmits that converted power to the event recorder 400 through recorder cable 410.

The camera 300 has a video camera 320 and a microphone 330 for generating video and audio signals of an area under surveillance by the surveillance system 100. These video and audio signals are sent to the monitor 200 through camera cable 310. A cathode ray tube (CRT) 260 in the monitor 200 uses the video signals to display the image received by the video camera 320 in the camera 300 A speaker 270 in the monitor 200 uses the audio signals to project the noises received by the microphone 330 in the camera 300.

The activation unit 500 contains a sensor, such as a passive infrared (PIR) sensor 520, for detecting a condition for which the surveillance system 100 requires activation. Although the present embodiment illustrates the use of the PIR sensor 520, other sensors, such as glass break detectors, motion detectors, open circuit sensors, closed circuit sensors, or the like, can be used in place thereof. When the PIR sensor 520 senses a condition for activating the surveillance system 100, the activation unit 500 sends an activation signal to the camera 300 through the activation unit cable 510. The camera 300, in turn, sends the activation signal to the monitor 200 through the camera cable 310. A processor 250 in the monitor 200 receives the activation signal from camera cable 310. Upon receiving the activation signal, the processor 250 sends the video signals and audio signals from the camera 300 to the event recorder 400, and a command for the event recorder 400 to record the video and audio signals generated by the camera 300. If the sensor in the activation unit 500 is a sensor receiving a transient condition, such as the breaking of glass, the processor 250 can determine a preset time period for which the event recorder 400 is to record the video and audio signals generated by the camera 300. Although the processor 250 is illustrated herein as being a part of the monitor 200, the processor 250 can be a separate component from the monitor 200, or a part of any other component in the surveillance system 100, such as the event recorder 400. Also, although FIG. 1 illustrates the video and audio signals from the camera 300 as passing through the processor 250 before reaching the event recorder 400 or the CRT 260 and the speaker 270 of the monitor 200, the video and audio signals could be routed directly to the event recorder 400 or the CRT 260 and the speaker 270 without requiring those signals to pass through the processor 250.

Although the surveillance system 100 of FIG. 1 is illustrated with only one camera 300, it is possible to have a plurality of cameras 300 connected to the monitor, with each camera 300 connected to an activation unit 500. Under normal operations of the surveillance system 100 having a plurality of cameras 300, the processor 250 sequentially displays for a short period of time the video and audio signals from each of the cameras 300. Upon receiving an activation signal, the processor 250 displays only the video and audio signals from the camera 300 attached to the activation unit 500 sending the activation signal. Also upon receiving the activation signal, the processor 250 activates the event recorder 400 to record the video and audio signals generated by the camera 300 and sent to the event recorder 400 by the processor 250.

Figure 2:
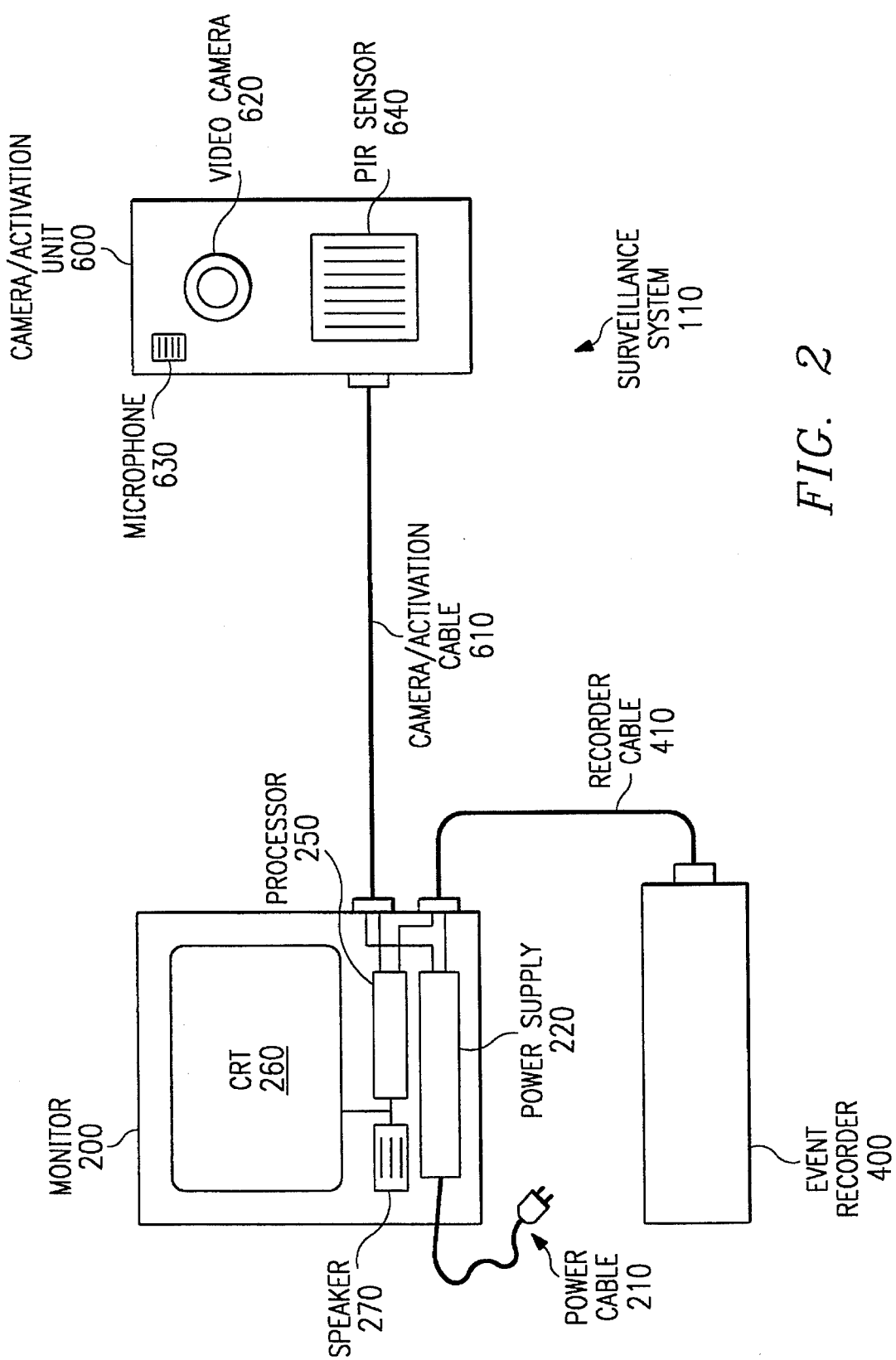
FIG. 2 is a block diagram of an alternate preferred embodiment of the present invention having the camera and the activation unit incorporated into a single unit and FIG. 3 is a block diagram of another alternate preferred embodiment of the present invention having an activation unit which uses a trickle charged battery for powering auxiliary devices.

Referring now to FIG. 2, there is shown a block diagram of an alternate preferred embodiment of the present invention, illustrated as a surveillance system 110. The surveillance system 110 generally comprises the monitor 200, a camera/activation unit 600 connected to the monitor 200 by a cable 610, and the event recorder 400 connected to the monitor 200 by the cable 410 The monitor 200 has a power cable 210 for receiving electrical power. A power supply 220 in the monitor 200 converts the power from the power cable 210 into a form useable by the camera/activation unit 600. The converted power is supplied from the power supply 220 to the camera/activation unit 600 through the camera/activation cable 610. The power supply 220 also converts power from the power cable 210 into a form useable by the event recorder 400, and transmits that converted power to the event recorder 400 through the recorder cable 410.

The camera/activation unit 600 has a video camera 620 and a microphone 630 for generating video and audio signals of an area under surveillance by the surveillance system 110. These video and audio signals are sent to the monitor 200 through the camera/activation cable 610. A cathode ray tube (CRT) 260 in the monitor 200 uses the video signals to display the image received by the video camera 620 in the camera/activation unit 600. A speaker 270 in the monitor 200 uses the audio signals to project the noises received by the microphone 630 in the camera/ activation unit 600.

The camera/activation unit 600 also contains a sensor, such as a PIR sensor 630, for detecting a condition for which the surveillance system 110 requires activation. Although the present embodiment illustrates the use of a PIR sensor 630, other sensors, such as glass break detectors, motion detectors, open circuit sensors, closed circuit sensors, or the like, can be used in place thereof. When the PIR sensor 640 detects a condition for which the surveillance system 110 wishes to record, the camera/activation unit 600 sends an activation signal through the camera/activation cable 610 to the processor 250 in the monitor 200. Upon receiving the activation signal, the processor sends the video and audio signals from the camera/activation unit 600 to the event recorder 400, and a command for the event recorder 400 to record the video and audio signals generated by the camera/ activation unit 600. If the sensor in the camera/activation unit 600 is a sensor receiving a transient condition, such as the breaking of glass, the processor 250 can determine a preset time for which the event recorder is to record the video and audio signals generated by the camera/activation unit 600. Although the processor 250 is illustrated herein as being part of the monitor 200, the processor can be a separate component from the monitor 200, or a part of any other component in the surveillance system 110, such as the event recorder 400. Also, although FIG. 2 illustrates the video and audio signals from the camera/activation unit 600 as passing through the processor 250 before reaching the event recorder 400 or the CRT 260 and the speaker 270 of the monitor 200, the video and audio signals could be routed directly to the event recorder 400 or the CRT 260 and the speaker 270 without requiring those signals to pass through the processor 250.

As with the surveillance system 100 of FIG. 1, the surveillance system 110 in FIG. 2 can have a plurality of camera/activation units 600 connected to the monitor 200. Under normal conditions, the processor 250 sequentially displays for a short period of time the video and audio signals from each of the plurality of camera/activation units 600. Upon receiving an activation signal from a particular camera/activation unit 600, the processor 250 causes the video and audio signals of the camera/activation unit 600 sending the activation signal, to be displayed on the monitor 200 continuously. Also upon receiving an activation signal from a particular camera/activation unit 600, the processor 250 sends a command through the recorder cable 410 for the event recorder to record the video and audio signals, which are also sent to the event recorder 400 through the recorder cable 410 of the camera/activation unit 600 sending the activation signal.

Figure 3:
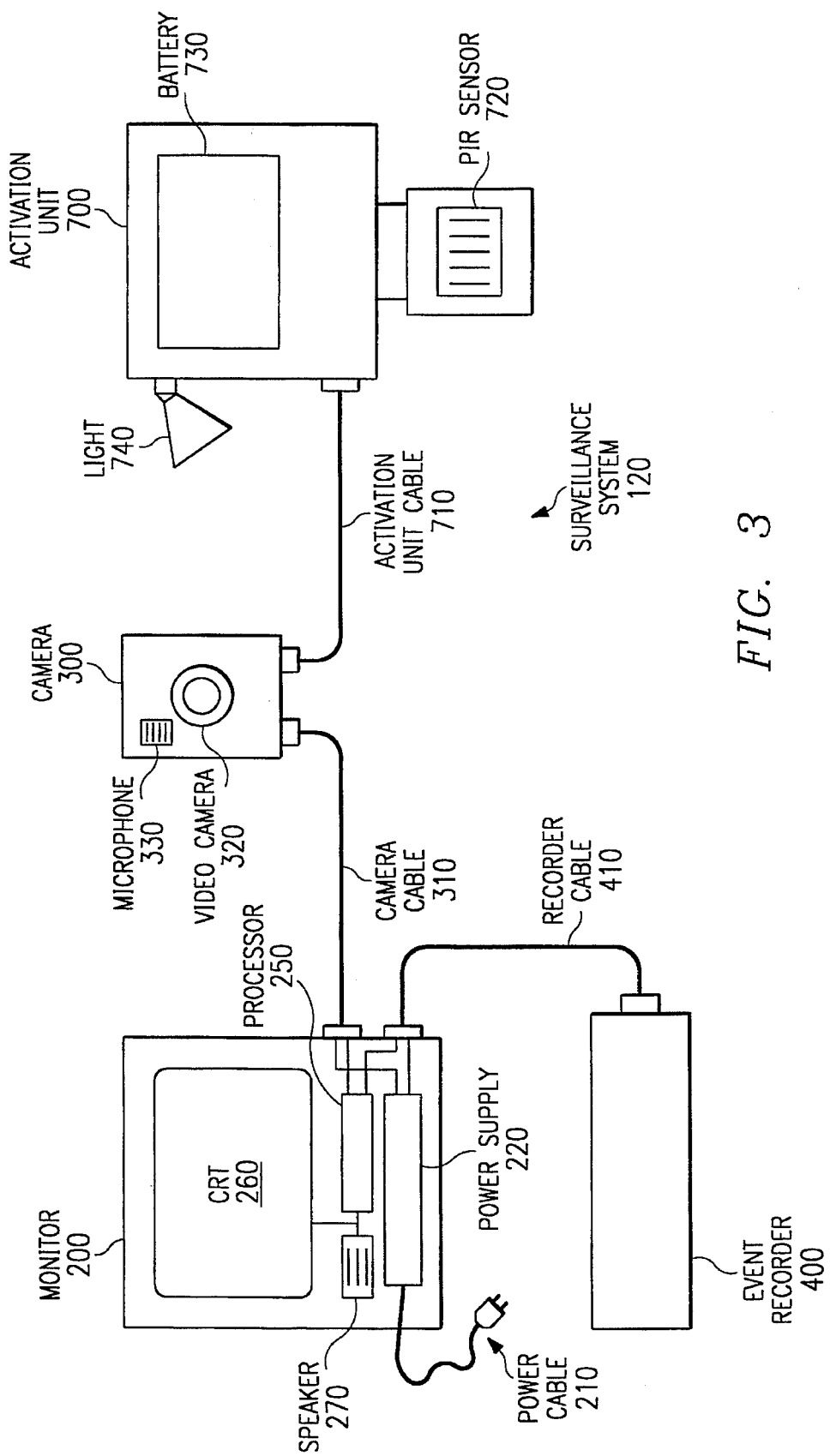

Referring now to FIG. 3, there is shown a block diagram of another alternate preferred embodiment of the present invention, illustrated as a surveillance system 120. The surveillance system 120 has the monitor 200, the camera 300 connected to the monitor 200 by the cable 310, an event recorder 400 connected to the monitor 200 by the recorder cable 410, and an activation unit 700 connected to the camera 300 by an activation unit cable 710. The monitor 200 receives power through the power cable 210. A power supply 220 in the monitor 200 converts the power from the power cable 210 to a form for use by the camera 300 and the activation unit 700. The camera 300 receives this converted power from the power supply 220 through the camera cable 310. The activation unit 700 receives the power converted by the power supply 200 from the camera 300 through the activation unit cable 710. The activation unit 700 uses the converted power to trickle charge a battery 730 and to power the PIR sensor 720. The power supply 220 of the monitor 200 also converts the power from the power cable 210 for use by the event recorder 400 and transmits that converted power to the event recorder 400 through recorder cable 410.

Similarly to the surveillance system 100 in FIG. 1, the camera 300 of surveillance system 120 in FIG. 3 has a video camera 320 and a microphone 330 for generating video and audio signals of the area under surveillance by the surveillance system 120. These video and audio signals are sent to the monitor 200 through cable 310. The monitor 200 then displays the video images from video camera 320 on the CTR 260, and projects the noises received by the microphone 330 over the speaker 270.

The activation unit 700 contains a sensor, such as a PIR sensor 720, for detecting a condition for which the surveillance system 120 requires activation. Although the present embodiment illustrates the use of a PIR sensor 720, other sensors, such as glass break detectors, motion detectors, open circuit detectors, closed circuit detectors, or the like, can be used in place thereof. When the PIR sensor 720 senses a condition for activating the surveillance system 120, the activation unit 700 sends an activation signal through the activation unit cable 710, the camera 300, and the camera cable 310 to a processor 250 in the monitor 200. Upon receiving the activation signal, the processor 250 sends the video and audio signals from the camera 300 to the event recorder 400, and a command for the event recorder to record the video and audio signals generated by the camera 300. If the sensor in the activation unit 700 is a sensor receiving a transient condition, such as the breaking of glass, the processor 250 can determine a preset time period for which the event recorder is to record the video and audio signals generated by the camera 300. Although the processor 250 is illustrated herein as being part of the monitor 200, the processor 250 can be a separate component from the monitor 200, or a part of any other component in the surveillance system 120, such as the event recorder 400. Also, although FIG. 3 illustrates the video and audio signals from the camera 300 as passing through the processor 250 before reaching the event recorder 400 or the CRT 260 and the speaker 270 of the monitor 200, the video and audio signals could be routed directly to the event recorder 400 or the CRT 260 and the speaker 270 without requiring those signals to pass through the processor 250.

Upon sensing by the PIR sensor 720 of a condition for which the surveillance system 120 required to activate, the activation unit 700 activates an auxiliary device, such as the light 740. Because the power demand of an auxiliary device, such as the light 740, is greater than the power provided to the activation unit 700 through the activation unit cable 710, a battery 730 supplies the power to operate the auxiliary unit for a predetermined period of the condition to be recorded. Although the activation unit 700 has been shown with an auxiliary device of the light 740, other auxiliary equipment such as sirens, horns, or the like, can be used with the battery 730 on the activation unit 700.

As with the surveillance system 100 of FIG. 1, it is possible for the surveillance system 120 in FIG. 3 to have a plurality of cameras 300 connected to the monitor 200, with each camera 300 connected to an activation unit 700. Under normal operations of the surveillance system 120 having a plurality of cameras 300, the processor 250 would sequentially display for a short period of time the video and audio signals from each of the cameras 300. Upon receiving an activation signal from the activation unit 700, the processor 250 causes the monitor 200 to display only the video and audio signals from the camera 300 sending the activation signal from its associated activation unit 700. Also upon receiving an activation signal, the processor 250 activates the event recorder 400 to record the audio and video signals generated by the camera 300 and sent to the event recorder 400 by the processor 250.

It is thus believed that the operation and construction of the present invention will be apparent from the foregoing description. While the system shown and described has been characterized as being preferred, it will be readily apparent that the various changes and modifications could be made therein without departing from the spirit and scope of the present invention as defined in the following claims.

What is claimed is:

1. A surveillance system comprising:

a television camera;

a television monitor;

an event recorder;

means for delivering surveillance signals from said television camera to said television monitor;

means for delivering surveillance signals from said television camera to said event recorder;

an activation unit;

means for delivering power to said monitor;

means for delivering power to said camera from said monitor;

means for delivering power from said camera to said activation unit;

means for delivering a signal from said activation unit to said event recorder; and wherein said activation unit comprises a motion sensor.

2. The surveillance system as in claim 1, wherein said television camera and said activation unit are combined into a single component.

3. The surveillance system as in claim 1, wherein said activation unit further comprises:

a battery; and means for delivering power from said camera to said battery.

4. The surveillance system as in claim 3, wherein said activation unit includes:

an auxiliary device; and means for providing power from said battery to said auxiliary device when said activation unit sends said signal to said event recorder.

5. A surveillance system comprising:

an event recorder;

a television monitor;

a plurality of television cameras;

a plurality of activation units;

means for delivering power to said television monitor;

means for delivering power to said plurality of television cameras from said television monitor;

means for delivering power to said plurality of activation units from said plurality of television cameras;

means for delivering surveillance signals from said plurality of television cameras to said television monitor;

means for delivering said surveillance signals from said plurality of television cameras to said event recorder;

means for delivering an activation signal from one of said plurality of activation units to one of said plurality of television cameras;

processor means for receiving said aeration signal from said one of said plurality of television cameras and causing said television monitor to display said surveillance signals from said one of said television cameras, and causing said event recorder to record the surveillance signals from said one of said television cameras and wherein said activation units comprise motion sensors.

6. The surveillance system as in claim 5, wherein said plurality of television cameras and said plurality of activation units are components of a plurality of camera/activation units, each having at least one television camera and one activation unit.

7. The surveillance system as in claim 5, wherein each of said activation units further comprises;

a battery; and means for delivering power from one of said television cameras to said batteries.

8. The surveillance system as in claim 7, wherein each of said activation units include:

an auxiliary device; and means for providing power to said auxiliary device when said activation unit sends said activation signal to said one of said television cameras.

9. A method of powering a surveillance system, comprising the steps of:

providing electrical power to a monitor from a power source;

providing electrical power to a camera from said monitor;

providing electrical power to an activation unit from said camera; and providing a motion sensing function in said activation, unit.

10. The method according to claim 9, wherein said step of providing electrical power to an activation unit includes providing power from said camera to a battery in said activation unit.

* * * * *

UNITED STATES PATENT AND TRADEMARK OFFICE
CERTIFICATE OF CORRECTION

PATENT NO. : 5,495,288
DATED : February 27, 1996
INVENTOR(S) : Broady, George K. et al.

It is certified that error appears in the above-indentified patent and that said Letters Patent is hereby corrected as shown below:

Column 2, line 43       Replace "KM-091Co"
                            With --KM-091C.--

Column 7, line 19       Replace "aeration"
                            With --activation--

Column 7, line 24       Replace "cameras"
                            With --cameras;--

Column 8, line 22       Replace "activation,"
                            With --activation--

Signed and Sealed this

Twenty-fifth Day of June, 1996

Attest:

BRUCE LEHMAN

*Attesting Officer*        *Commissioner of Patents and Trademarks*